UNITED STATES PATENT OFFICE.

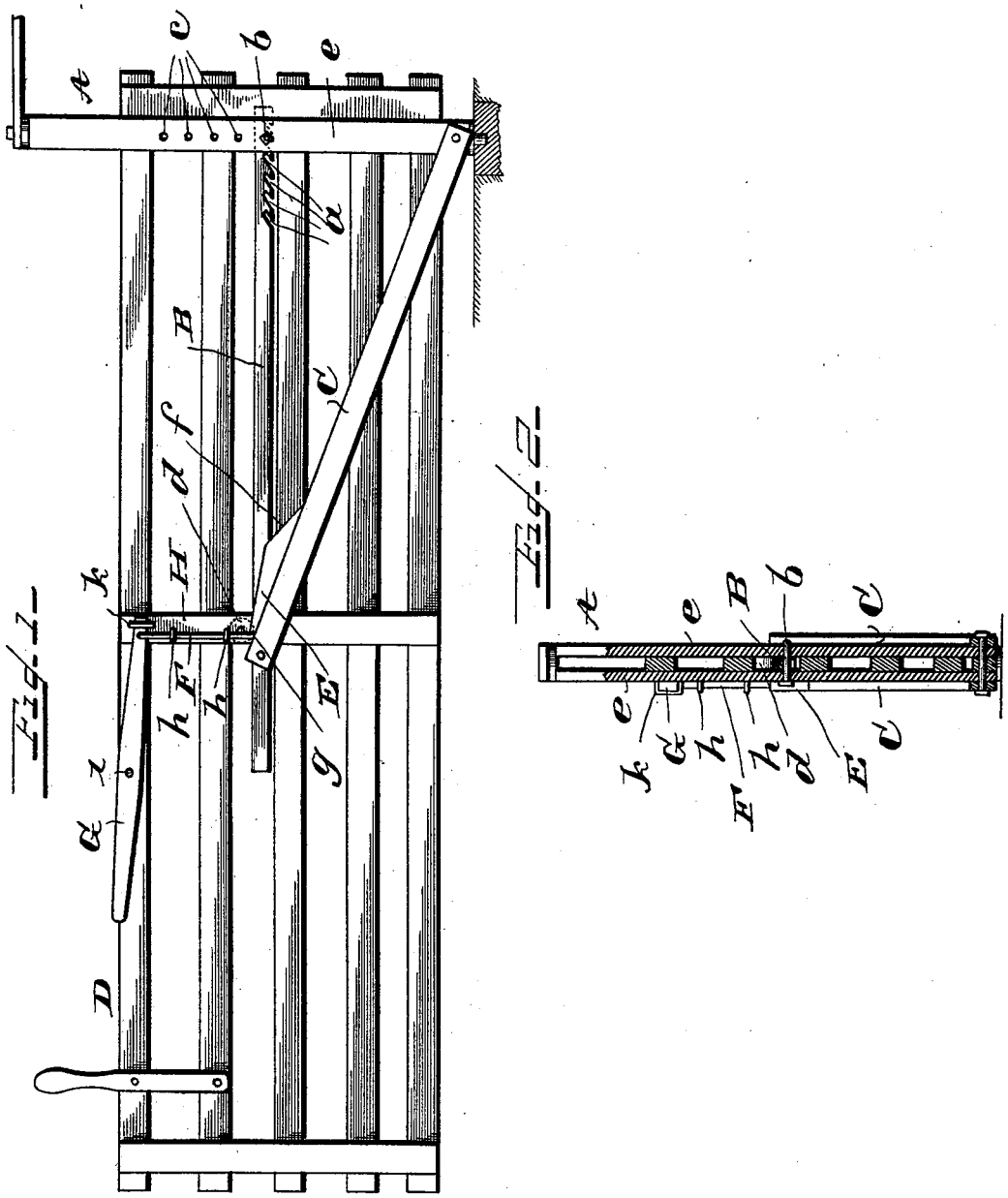

MARSHALL P. FRANTZ, OF SALEM, VIRGINIA.

SLIDING GATE AND LATCH.

SPECIFICATION forming part of Letters Patent No. 592,628, dated October 26, 1897.

Application filed February 13, 1897. Serial No. 623,296. (No model.)

*To all whom it may concern:*

Be it known that I, MARSHALL P. FRANTZ, a citizen of the United States, residing at Salem, in the county of Roanoke and State of Virginia, have invented certain new and useful Improvements in Sliding Gates and Latches; and I do hereby declare the following to be a full, clear, and exact description of the invention, such as will enable others skilled in the art to which it appertains to make and use the same.

My invention relates to gates, and has especial reference to that class of gates which slide or roll on suitable ways or supports; and it consists in certain improvements in construction which will be fully disclosed in the following specification and claims.

In the accompanying drawings, which form part of this specification, Figure 1 represents a side elevation of my improved gate and latch, and Fig. 2 a vertical transverse section of the same through the pivot-post of the supporting-frame of the gate.

Reference being had to the drawings and the letters thereon, A indicates the vertical pivot-post of the suspending-frame, which post is journaled at its upper and lower ends to swing the gate laterally; B, a horizontal track-bar on which the gate slides; C C, inclined braces pivotally secured at their inner and lower ends to the post A and secured in like manner at their outer and upper ends to the track-bar B near the outer end thereof, with the track-bar extending about six inches beyond the side braces and the center vertical transverse bar of the gate. As heretofore constructed, in dropping the gate to the ground by means of the horizontal bar of the frame it has been necessary to lift or raise the gate with one hand and lift the bar and hold it with the other hand until the gate dropped to the ground. By means of the extension of the bar the same result can be accomplished by simply raising the gate and pressing upward on the extension.

The rear and lower edge of the track-bar is provided with notches *a*, which engage a rod or pin *b* in the pivot-post A, supported in a series of holes *c* for the purpose of adjusting the gate vertically to clear obstructions or to admit of the passage of small animals.

A roller *d* between and journaled in the center vertical brace-bars H is provided to run on the track-bar, and the gate D slides between the sides *e e* of the pivot-post and between the inclined braces C C.

Near the outer end and on the upper edge of one of the inclined braces is secured a block or keeper E, which is provided with an inclined upper edge, a beveled rear end *f*, and a square front end *g*, the former providing an easy track or way for the gravity-bolt F to ride upon in closing the gate and the latter forming a shoulder to engage the bolt and lock the gate in closed position. The upper end of the vertical gravity-bolt F is pivotally secured to the lever G near its outer end, is held in position to rise and fall freely on one of the vertical transverse and center brace-bars H of the gate by suitable staples *h h*, and when the bolt is down and the gate closed the bolt rests upon the brace C. The lever G is fulcrumed at *i* upon the upper bar I of the gate and is further secured to the gate by an elongated staple *k*.

By the construction shown the latch is in the center of the gate, and the gate when closed is securely locked to its supporting-frame, and in opening the gate the person desiring to open it presses the lever G, and thus releases the gate from its supporting-frame by raising the latch out of engagement with its keeper and then pushes the gate open into the position desired, and in closing the operator pushes the gate to its full extent, and the bolt F automatically drops behind the shoulder *g*, thus securely latching or fastening the gate. This movement can be accomplished as easily by a horseman as by a footman.

Having thus fully described my invention, what I claim is—

1. The combination of a gate, a supporting-frame having a track-bar extending beyond the side braces and the center of the gate to form a lever to tilt the gate and provided with a series of notches, and means for engaging said notches to support the gate in its several positions.

2. The combination of a supporting-frame, a gate mounted to slide thereon, a keeper on the supporting-frame and a vertical bolt secured to the gate to engage the keeper.

3. The combination of a supporting-frame, a gate mounted to slide thereon, a keeper provided with an inclined upper edge and rear end and secured to one of the inclined braces of the frame, a vertically-movable bolt engaging said keeper and a lever for raising the bolt.

In testimony whereof I affix my signature in presence of two witnesses.

MARSHALL P. FRANTZ.

Witnesses:
J. W. JOHNSTON,
M. G. McCLUNG.